United States Patent [19]

Brauers et al.

[11] Patent Number: 4,695,064
[45] Date of Patent: Sep. 22, 1987

[54] PISTON RING ASSEMBLY AND EXPANDER

[75] Inventors: Bert Brauers; Martin Morsbach, both of Burscheid, Fed. Rep. of Germany

[73] Assignee: Goetze AG, Burscheid, Fed. Rep. of Germany

[21] Appl. No.: 839,171

[22] Filed: Mar. 13, 1986

[30] Foreign Application Priority Data

Aug. 23, 1985 [DE] Fed. Rep. of Germany ....... 3530175

[51] Int. Cl.⁴ ................................................ F16J 9/06
[52] U.S. Cl. .................................. 277/139; 277/141; 267/1.5
[58] Field of Search ................................ 277/138–145; 267/1.5

[56] References Cited

U.S. PATENT DOCUMENTS 2,855,254 10/1958 Beck et al. .
3,627,333 12/1971 Hill .
4,462,602 7/1984 Brauers et al. ..................... 277/139

FOREIGN PATENT DOCUMENTS 1087855 8/1960 Fed. Rep. of Germany ...... 277/139
3208396 5/1983 Fed. Rep. of Germany .
47-29608 3/1972 Japan .................................. 277/139
47-29610 3/1972 Japan .................................. 277/139

Primary Examiner—Robert S. Ward
Attorney, Agent, or Firm—Spencer & Frank

[57] ABSTRACT

A piston-and-ring assembly includes a generally cylindrical piston, a circumferential groove provided in the piston and having a bottom and two radial flanks forming opposite sides of the groove; and an expander spring ring accommodated in the groove and including a plurality of generally radially extending tongues arranged in a circumferential series. Each tongue has, at a radially inward end, a leg portion extending at a first angle other than zero to the respective tongue from which it extends. An oil scraper annular lamina is situated in the groove and is supported axially by the tongues and is abutted radially by the leg portions. An extension forms part of each leg portion and is oriented thereto at an inclination. Each extension has a length which extends substantially from one of the flanks to the other.

4 Claims, 6 Drawing Figures

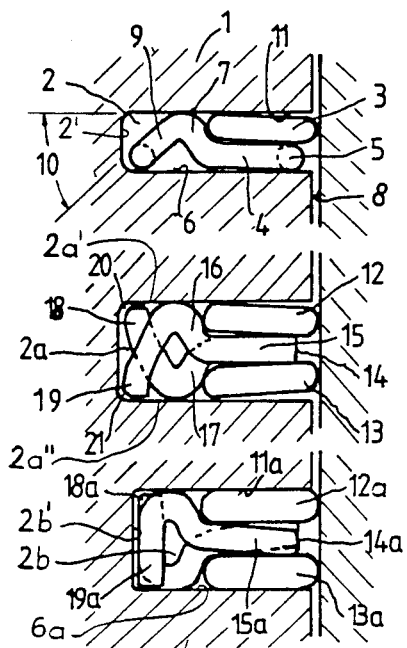
Fig. 1
Fig. 2
Fig. 3
Fig. 4
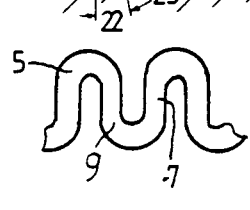
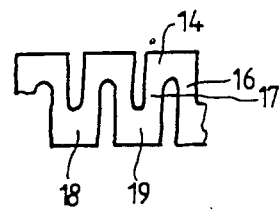
Fig. 5
Fig. 6

PISTON RING ASSEMBLY AND EXPANDER

BACKGROUND OF THE INVENTION

This invention relates to a piston ring assembly, particularly an oil scraper piston ring assembly which is of small axial height and which is formed of an expander spring ring made particularly of a resilient strip material and at least one annular lamina which lies at least partially on a plurality of radially extending and circumferentially serially arranged tongues of the expander spring. Further, the lamina abuts generally axially bent legs which form part of the tongues and which have radially inwardly oriented extensions.

U.S. Pat. No. 3,627,333 discloses a three-part piston ring assembly which has two annular laminae and an annular expander spring disposed therebetween. This piston ring system is of low axial heigh and is installed in piston grooves for wiping oil along the cylinder wall in an internal combustion engine. The metal strip expander spring is, as viewed circumferentially, provided with slots which extend in an alternating circumferential series, from the radially inner and the radially outer circular edge of the annular strip. In this manner a circumferential series of radially oriented resilient tongues are obtained. In the radially inner zone of the expander spring approximately axially bent legs are provided which are alternatingly oriented in opposite directions and which serve for the radial support of each lamina. The resilient, radially extending tongues form a support surface for the two laminae. In addition to a low axial height, such a piston ring assembly also has a relatively small radial wall thickness. Such an expander spring design results in very short leverage arms, and thus a hard spring characteristic is obtained. Disadvantageously, hard spring characteristics, in turn, lead during operation to a rapid drop of the tangential force of the piston ring as wear occurs.

In the piston ring construction disclosed in German Pat. No. 3,208,396, by virtue of the use of a radially wide strip material, a softer spring characteristic of the expander spring is obtained. The axially bent legs radially engage behind the laminae and have radially inwardly extending continuations. While the advantages sought for are achieved, the radial wall thickness of the piston ring assembly is necessarily increased. Such dimensional change requires deeper piston grooves which, however, may cause strength problems in the piston design.

U.S. Pat. No. 2,855,254 discloses a two-part piston ring assembly which is formed of an axially relatively large piston ring and an expander spring which is made of a strip material with a rectangular or round cross section and which extends, with alternating portions, axially adjacent and radially behind the piston ring. The expander spring legs which extend radially behind the piston ring may be oriented at an acute angle to the inner circumferential face (side) of the piston ring. In this manner, a contacting of the expander spring by the piston ring occurs only along the inner circumferential piston ring edge which is oriented towards the expander spring.

SUMMARY OF THE INVENTION

It is an object of the invention to provide a piston ring assembly of axially and radially small dimensions which is of particularly compact construction and thus requires only a small piston groove volume, which results in a relatively soft spring characteristic of the expander spring ring and which is readily adaptable to varying piston groove depths of serially manufactured engine pistons.

These objects and others to become apparent as the specification progresses, are accomplished by the invention, according to which, briefly stated, the piston-and-ring assembly includes a generally cylindrical piston, a circumferential groove provided in the piston and having a bottom and two radial flanks forming opposite sides of the groove; and an expander spring ring accommodated in the groove and including a plurality of generally radially extending tongues arranged in a circumferential series. Each tongue has, at a radially inward end, a leg portion extending at a first angle other than zero to the respective tongue from which it extends. An oil scraper annular lamina is situated in the groove and is supported axially by the tongues and is abutted radially by the leg portions. An extension forms part of each leg portion and is oriented thereto at an inclinatio. Each extension has a length which extends substantially from one of the flanks to the other.

A 90° angle of the extensions to the groove flanks ensures an optimally low overall radial dimension of the piston ring assembly. In practice, a minimum angle of the extension of approximately 45° is preferred to achieve an appreciable shortening of the radial wall thickness of the piston ring while soft spring characteristics are ensured. Preferably, the angle between the extension of the legs and the piston groove flank should be between 60° and 90°. Particularly when strip material of rectangular cross section is used for making the expander spring, it is advantageous to round the radially inner bounding edges of the extensions in order to achieve an optimal adaptation to the equally rounded corners where the piston groove flank and the groove base meet. It is within the scope of the invention to bend the extensions through an angle of more than 90° so that the radially inner bounding faces extend at an acute angle to the other piston groove flank. In this manner, account is again taken for a rounding of the piston groove base without adversely affecting the resilient and sealing properties of the piston ring.

BRIEF DESCRIPTION OF THE DRAWING

FIG. 1 is a schematic sectional side elevational view of a first preferred embodiment of the invention.

FIG. 2 is a schematic sectional side elevational view of a second preferred embodiment of the invention.

FIG. 3 is a schematic sectional side elevational view of a third preferred embodiment of the invention.

FIG. 4 is a schematic sectional side elevational view of a fourth preferred embodiment of the invention.

FIG. 5 is a fragmentary developed view of a blank of a first type from which a component of preferred embodiments may be made.

FIG. 6 is a fragmentary developed view of a blank of a second type from which a component of preferred embodiments may be made.

DESCRIPTION OF THE PREFERRED EMBODIMENTS

Turning now to FIG. 1, a two-part piston ring assembly, formed of a lamina 3 and an expander spring 4 is received in a piston groove 2 of a piston 1 with a radial play relative to the piston bottom 2'. The lamina 3 is supported on radially extending resilient tongues 5 of a cross-sectionally circular expander spring ring 4 whose blank is shown in a developed state in FIG. 5. The tongues 5 are supported on the groove flank 6 and have legs 7 bent out of a radial plane towards the ring axis. The legs 7 which thus are at an inclination to the respective tongues from which they extend, press the lamina 3 radially into contact with a cylinder wall 8. Each leg 7 has an extension 9 which projects from the end of the respective leg 7 towards the lower piston groove flank 6 at an angle 10 having a magnitude of 45° with respect to the opposite piston groove flank 11.

In the embodiment illustrated in FIG. 2 there is shown a three-part piston ring assembly formed of two laminae 12 and 13 and a cross-sectionally rectangular expander spring ring 14 whose blank is shown in a developed state in FIG. 6. The expander spring 14 extends with its resilient tongues 15 between the two laminae 12, 13. The leg portions 16 and 17 of successive tongues 15 are bent out of a radial plane behind the laminae 12 and 13 and have axially oppositely oriented, slightly arcuately bent extensions 18, 19 which are situated at an angle of 60° relative to the respective opposite groove flanks 2a' and 2a'' of the groove 2a. The parts 18 and 19 extend almost to respective groove corners 20 and 21. The radially inner ends of the extensions 18, 19 are rounded, similarly to the rounded corners 20, 21 of the piston groove 2a, to prevent there a contacting by the ring assembly in the normal position.

In the embodiment according to FIG. 3, the extensions 18a and 19a of successive tongues 15a of the expander spring 14a are oriented at 90° to the groove flanks 6a and 11a, that is, they extend parallel to the bottom 2b' of the piston groove 2b. The tongues 15a of the expander spring 14a are, as viewed in the circumferential direction alternatingly bent in opposite axial directions out of a radial plane to thus have an additional axial resilient effect on the laminae 12a and 13a.

Turning now to the embodiment illustrated in FIG. 4, for avoiding the necessity of providing additional roundings on the radially inner edges of the expander spring extensions 18b, 19b, the latter are bent to such an extent that they are oriented at an acute angle 22 away from the bottom 2c' of the piston groove 2c. In this manner, once again, an acute angle 23 is formed between the extensions 19b and the groove flank 24 and an acute angle 25 is formed between the extensions 18b and the groove flank 26.

It is noted that the orientation of the extensions 9 (FIG. 1), 18 and 19 (FIG. 2), 18a and 19a (FIG. 3) and 18b and 19b (FIG. 4) may be related, instead of the groove flanks, to radial bottom and top faces of an imaginery shallow cylinder circumscribable about the respective expander spring ring. Thus, for example, for the expander spring ring 4 of FIG. 1, such circumscribable shallow cylinder would have a circumferential surface, a top radial face and a bottom radial face which would correspond, respectively, to the groove bottom 2' and the groove flanks 11 and 6, respectively.

Turning one again to FIG. 5, there is illustrated therein, in a fragmentary developed view, an expander spring blank prior to the bending of the parts 7 and 9 out of a radial plane. The blank is a wire of round cross section.

Turning once again to FIG. 6, there is shown in a fragmentary developed view, a blank of, for example, the expander spring 14 of the FIG. 2 embodiment, prior to the bending of parts 16–19 out of a radial plane. The material of he blank is a resilient metal strip of rectangular cross section. This construction also may find application in the embodiments according to FIGS. 3 and 4. It is further noted that both FIGS. 5 and 6 illustrate constructional principles only and are thus not drawn to scale.

It will be understood that the above description of the present invention is susceptible to various modifications, changes and adaptations, and the same are intended to be comprehended within the meaning and range of equivalents of the appended claims.

We claim:

1. A piston-and-ring assembly including a generally cylindrical piston having an axis and a circumferential groove having a bottom and two radial flanks forming opposite sides of the groove; an expander spring ring accommodated in said groove and including a plurality of generally radially extending tongues arranged in a circumferential series; each tongue having a radially inward end and a leg portion extending at an angle other than zero from a respective said tongue to one of said flanks; each said leg portion continuing in an extension provided with a free terminus; two oil scraper annular laminae situated in said groove and being supported axially by said tongues and being abutted radially by said leg portions, the improvement wherein said extension of each said leg portion is oriented thereto at an inclination; each said extension being oriented toward the other of said flanks and being of a length such that said free terminus reaches substantially to the other of said flanks.

2. A piston-and-ring assembly as defined in claim 1, wherein each said extension is oriented towards said one flank at an angle of at least 45°.

3. A piston-and-ring assembly as defined in claim 1, wherein each said free terminus is provided with a radially inner, rounded terminal edge.

4. A piston-and-ring assembly as defined in claim 1, wherein each said extension, as viewed from a respective said leg portion, is oriented at an acute angle away from said bottom.

* * * * *